United States Patent [19]
Andréasson

[11] Patent Number: 5,522,495
[45] Date of Patent: Jun. 4, 1996

[54] CONVEYOR DEVICE HAVING PARALLEL RECIPROCATING BEAMS WHICH CAN CARRY GOODS AS CONTAINERS OR PALLETS IN ITS RAISED POSITION

[75] Inventor: Kent Andréasson, Säve, Sweden

[73] Assignee: Trancel Technics AB, Sweden

[21] Appl. No.: 302,781

[22] PCT Filed: Mar. 11, 1993

[86] PCT No.: PCT/SE93/00214
§ 371 Date: Sep. 12, 1994
§ 102(e) Date: Sep. 12, 1994

[87] PCT Pub. No.: WO93/17944
PCT Pub. Date: Sep. 16, 1994

[30] Foreign Application Priority Data

Mar. 13, 1992 [SE] Sweden ................... 9200770

[51] Int. Cl.⁶ .................................. B65G 25/00
[52] U.S. Cl. .................................. 198/774.4
[58] Field of Search ............... 198/774.4, 468.6; 414/390, 398, 750

[56] References Cited

U.S. PATENT DOCUMENTS

| 3,420,358 | 1/1969 | Iversen | 198/774.4 |
| 3,512,628 | 5/1970 | Keough | 198/774.4 |
| 3,581,880 | 6/1971 | Iversen | |
| 3,952,887 | 4/1976 | Lutz | 198/774.4 |
| 4,040,514 | 8/1977 | Pielsticker et al. | 198/774.4 |
| 5,082,415 | 1/1992 | Hayashi | 414/398 |

FOREIGN PATENT DOCUMENTS 8604883  8/1986  WIPO.

Primary Examiner—Joseph E. Valenza
Attorney, Agent, or Firm—Lerner, David, Littenberg, Krumholz & Mentlik

[57] ABSTRACT

A loading device is formed with elongated goods moving devices. Each such device comprises a goods-carrying beam displaceable up and down relative to an underlaying frame. The underlying frame is countersinked in a storing surface for the goods, so that the goods-carrying beam while in its lowered position is under the storing surface and said goods carrying beam is over the storing surface in its raised position. A trolley supports the goods-carrying beam for a lengthwise movement on the frame. The goods-carrying beam and the trolley can be displaced lengthwise relative to each other, whereby the goods-carrying beam is displaced vertically. The displacement of the goods-carrying beam relative to the trolley is effected by means of elements activated by a power means to be pressed against supporting surfaces on the goods-carrying beam respective the trolley. In raised position of the goods-carrying beams the goods resting on the same can be moved by motion of the trolleys. In the lowered position the goods are carried by the storing surface.

6 Claims, 4 Drawing Sheets

CONVEYOR DEVICE HAVING PARALLEL RECIPROCATING BEAMS WHICH CAN CARRY GOODS AS CONTAINERS OR PALLETS IN ITS RAISED POSITION

TECHNICAL FIELD

The invention relates to a conveyor device for moving of goods according to the preample av claim 1. More close the invention relates to an, in a foundation arranged device by means of which goods placed on the same can be moved from a storing surface to another and essentially in horizontal direction.

PRIOR ART

From e.g. the European patent specification 0 103 999 (Dickson-Wright, Edward Anthony) is known a device for moving of goods. The same consists of a number of longitudinal and substantially parallel and in a foundation arranged moving organs. These are including an upper, goods carrying part and a lower profile which is counter-sinked in the foundation. In the profile is enclosed a rail for rollers, which allows the goods carrying part to be displaced relative to the profile. For raising and lowering of the rail and thereby also of the goods carrying part is provided a longitudinal, hose-shaped part, which can be expanded thereby raising the goods carrying part by supply a pressure medium as pressure air.

A similar device is known from the Swedish publication 318 822 (Iversen) and WO 86/04883 (Hagedorn). Raising and lowering of the goods carrying part is here effected by lengthwise displacement of this part relative to an underlaying trolley. The displacement is effected by means of pulling forces in a chain or similar flexible element which also is used for the movement of the trolley and which ends are secured to the trolley respective the goods carrying part.

The intention is that the foundation, in which the parts are counter-sinked, shall form a surface for placing of goods, which are delivered by means of other conveyors, fork-trucks or cranes for example. The goods carrying parts can be moved from a position within the reach of the rails to a position outside of the same. By raising of the goods carrying parts the on the foundation resting goods can be raised a little. By movement of the goods carrying parts also the on the same resting goods will be moved in the same direction and can consequently be moved to a position outside of the foundation. If also here is arranged a resting surface with recesses, which allow containing of the goods carrying parts, the goods by lowering of these parts can be placed on this resting surface whereof the goods carrying parts can be withdrawn in lowered position in the profiles for repetition of the operation. By moving of the goods carrying parts in its lowered position and thereafter effecting a raising and a return movement the goods can be moved in the other direction, consequently to be placed on the first said foundation.

Devices of this type are generally used for moving goods from a loading structure, to which it is delivered, and onto a vehicle for further transportation or reverse. The loading structure is thereby provided with the device and the vehicles have to be provided with recesses in their loading surface so that the longitudinal goods carrying parts can be contained. As it is of interest to design the device relatively slim also these recesses have to be provided with rails for supporting of the goods carrying parts and in some designs also with lifting means of the described type.

TECHNICAL PROBLEM

Devices of the first described type have in the first hand the disadvantage that the raising element, as mentioned having the shape of a hose, which as being made of a flexible, canvas-like material and has an extended form, is sensitive to damage and wearing of the material as a result of its frequent flexing and the inner pressure. Another disadvantage is that the only pressure medium which can be used in practise is pressure air; use of hydraulic fluid would bring a too large risk for damage through leaking. To provide a pressure air plant represents a relatively great effort, mucher greater than the providing of a hydraulic pump. The filling of the hose with air and above all emptying by raising respective lowering requires a substantial period of time as the hose often is of substantial length. Also the arrangement for moving of the goods carrying parts can bring problems when they are provided as a type of linear bearings, which are sensible to soiling and unbalanced loading.

By a solution of the second described type, the flexible element, in practise a roller chain, will be affected by very high traction forces when a heavy load has to be raised and to be held in raised position. This fact results in wearing in short time and risks for breaking of the flexible element.

BRIEF DESCRIPTION OF THE INVENTION

The invention has to its object to provide a conveyor device, which has the same basic design as the described and consequently can be used for moving of goods from storing surface to another and which in a simple way can be counter-sinked in the surface.

By the conveyor device according to the invention is not provided any raising means in the form of a hose shaped part and not either is any organ as a chain, which easy can be damaged, used for the raising of the goods. Instead is used a power cylinder which can be a hydraulic cylinder, which directly affects the goods carrying part and an underlaying trolley to make a displacement movement, which by means of certain organs effects raising of the goods. According to a preferred embodiment the goods is retained in raised position by a ratches means, which unload the power means and the raising mechanism in the raised position.

The advantage connected to the device according to the invention is thereby that the said raising organs have been replaced by rapid working power cylinders, which can be maneuvered by means of pressure liquid. A standard equipment can thereby be used, which will lower the production cost in relation to special solutions. Further is obtained that the device is very robust and is not provided with roller means of type linear bearing.

The device allows that the surface in which the device not is permanent installed, consequently in general at a vehicle, which shall be loaded and unloaded, not is necessary to be equipped with roller means or raising means as the mentioned hose, but can be provided with simple, counter-sinked rails. This fact is important as in general a large number of vehicles should serve a couple of loading places, why it is desired that the special devices at the vehicles are simple and not very cost consuming.

The advantages of the invention is obtained by providing the device with the characteristics, which are stated in claim 1.

DESCRIPTION OF THE FIGURES

On the accompanying drawings is shown an embodiment of the invention. Thereby is shown in.

PREFERRED EMBODIMENT

Figure 3:
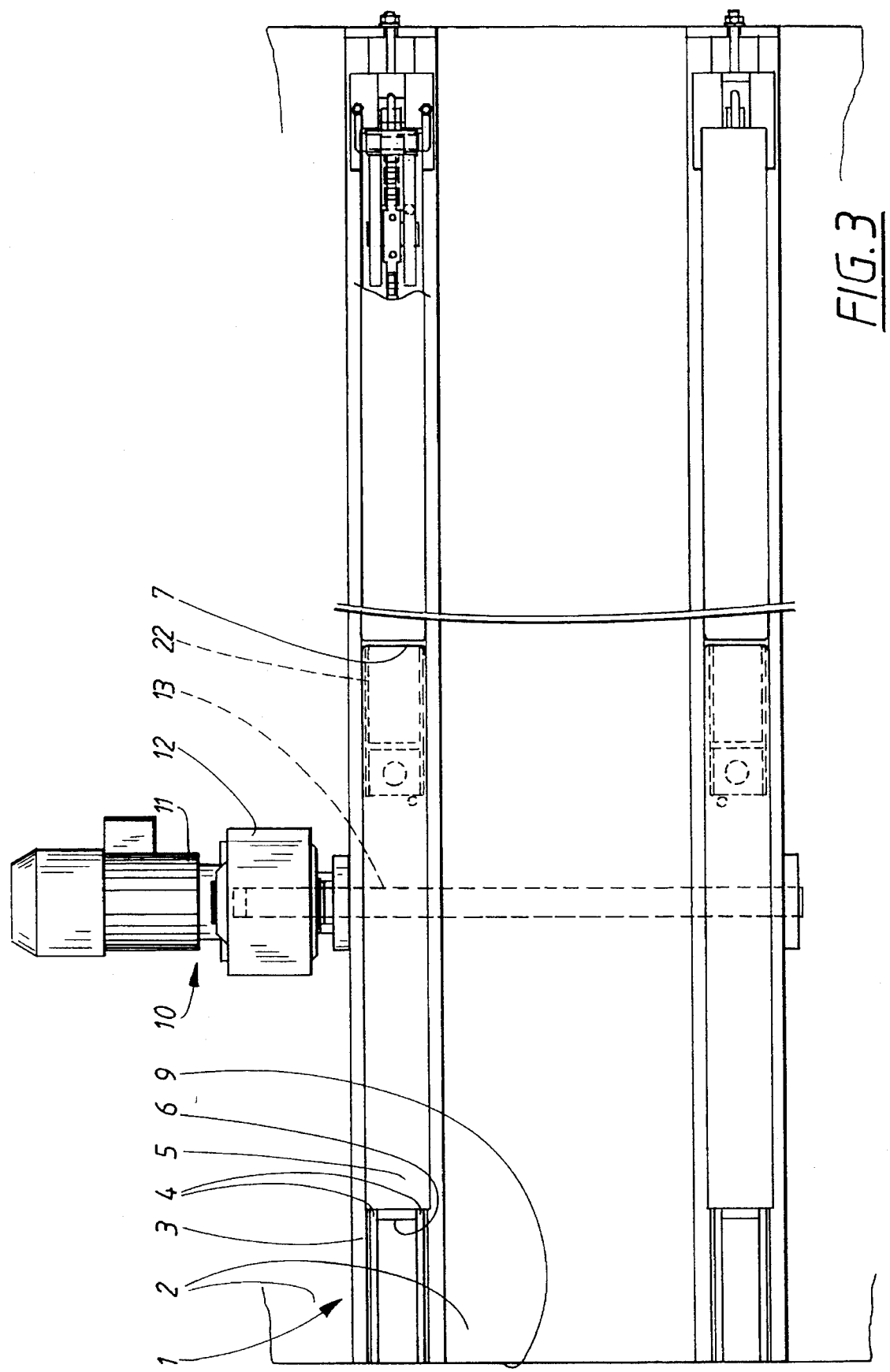
FIG. 3 a view from above of the device in a smaller scale than FIGS. 1 and 2.

According to the view from above in FIG. 3 the conveyor device according to the preferred embodiment comprises two longitudinal goods moving devices 1. The devices 1 are counter-sinked in a surrounding storing surface 2, the outer portions of which are cut away in the figure. The storing surface represents the upper plane of a loading structure or similar. The storing surface can thereby in some extension be provided as a conveyor. In the in FIG. 3 shown case e.g. the area between the goods moving devices 1 could be formed of the upper part of a band conveyor, the rest of which is stretching out to the right in the figure. This and other alternative embodiments of the arrangement around the goods moving devices as well as the number of the same can be varied in a way, which not is object of the present invention because of that the same can be adapted to all such alternative embodiments.

Each of the goods moving decives 1 comprises a part, which is permanent mounted on the foundation, which forms the storing surface 2, this part is in the following called the frame 3. The same in turn comprises two rails 4. On the rails 4 is a goods carrying beam 5 provided to be moveable in the longitudinal direction of the device 1 from the in FIG. 3 shown retracted position to a position stretching outside the border 9 of the surface 2 to the left in the figure. The goods carrying beam is, in the intention to give it a larger flexibility than a continuous unit could have, divided in sections; in the figure are two sections at each sides of a joint 7 shown. A trolley 6, which in FIG. 3 is nearly entirely covered by the goods carrying beam, supports the latter and makes its movement possible.

A moving device for the goods carrying beams 5 is indicated 10 and consists substantially of an electric motor 11, a gearbox 12 and one from the same driven shaft 13, which is stretching across the conveyor device and has driving connection to both the goods moving devices 1.

Figure 5:
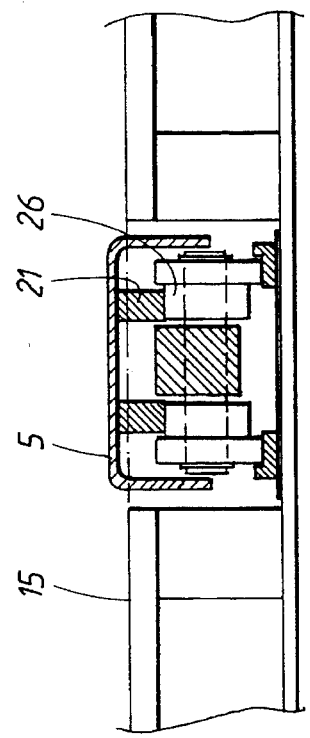
FIGS. 4 and 5 a cross-section of parts of the device in two different working positions.
Figure 4:
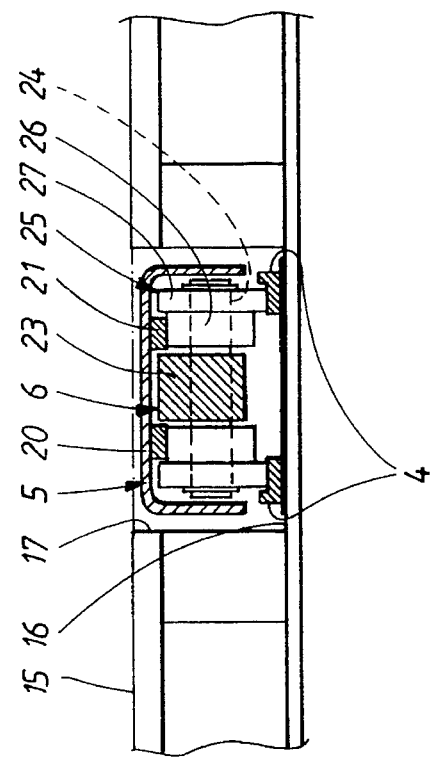

In FIGS. 4 and 5 is shown a cross-section of goods carrying beam 5 and the trolley 6 supporting the same and the frame 3 with the both rails 4. The plane 15 in the figures corresponds to the level for the storing surface 2 but is not situated on the loading structure or similar which the surface 2 is a part of. The purpose of the conveyor device according to the invention is namely that the goods carrying beams 5 together with respective trolley 6 could be moved out over the border 9 of the storing surface 2 for moving of goods outside of the same. As is evident by a comparison between FIGS. 4 and 5 the goods carrying beam 5 can be in a lowered position under the plane 15, see FIG. 4, or in a raised position over the plane 15, se FIG. 5. This is provided by means of displacement of the goods carrying beam 5 relative to the trolley 6 which thereby is resting on the rail 4.

As the conveyor device is intended to be used also by heavy loads in spite of its slim design, the goods carrying beams with its trolleys have to be provided with a support also outside the border 9. Such a support is not included in the conveyor device, as it is shown in FIG. 3, but is a part of some mobile equipment, which is intended to be brought adjacent to the border 9. Further the intention is to show in FIGS. 4 and 5 that the plane 15 belongs to such an equipment and consequently represents the storing surface on a loading structure of a loading vehicle as a truck or a railway carriage.

To make movement of the trolley 6 by means of rolling possible is thereby also the loading vehicle provided with rails corresponding to the rails 4 (they have same reference numeral in FIG. 4). After placing the loading vehicle near to the border 9 said rails should consequently form a direct continuation to the rails 4 according to FIG. 3. The rails 4 on the loading vehicle are resting against a lower plane 16 in a recess 17, which is stretching downwards from the storing surface 15. The recess is so deep that the rails, trolleys and goods carrying beams of the load carrying device could be contained, so that the overside of the goods carrying beam in lowered position of the same is situatated a short distance under the plane 15. The raising height of the load carrying beam thereby has to be so adapted, that it can be positioned in a level over the plane 15 in the raised position according to FIG. 5.

Here the general design of the conveying device has been described and also its working function, consequently, that the goods carrying beams 5 on its trolleys 6 could be moved in the longitudinal direction of the goods carrying devices 1 out over the end of the conveyor device and its supporting structure to an area, which is intended to be occupied by a loading vehicle provided with supporting rails for the load carrying beams. Also has been described the function, that the goods carrying beams are possible to raise and to lower up over and down under the load carrying planes, which partly surrounds the goods carrying devices in its countersinked position in the foundation and partly outside of the foundation to an area represented by the loading plane of the loading vehicle.

Figure 1:
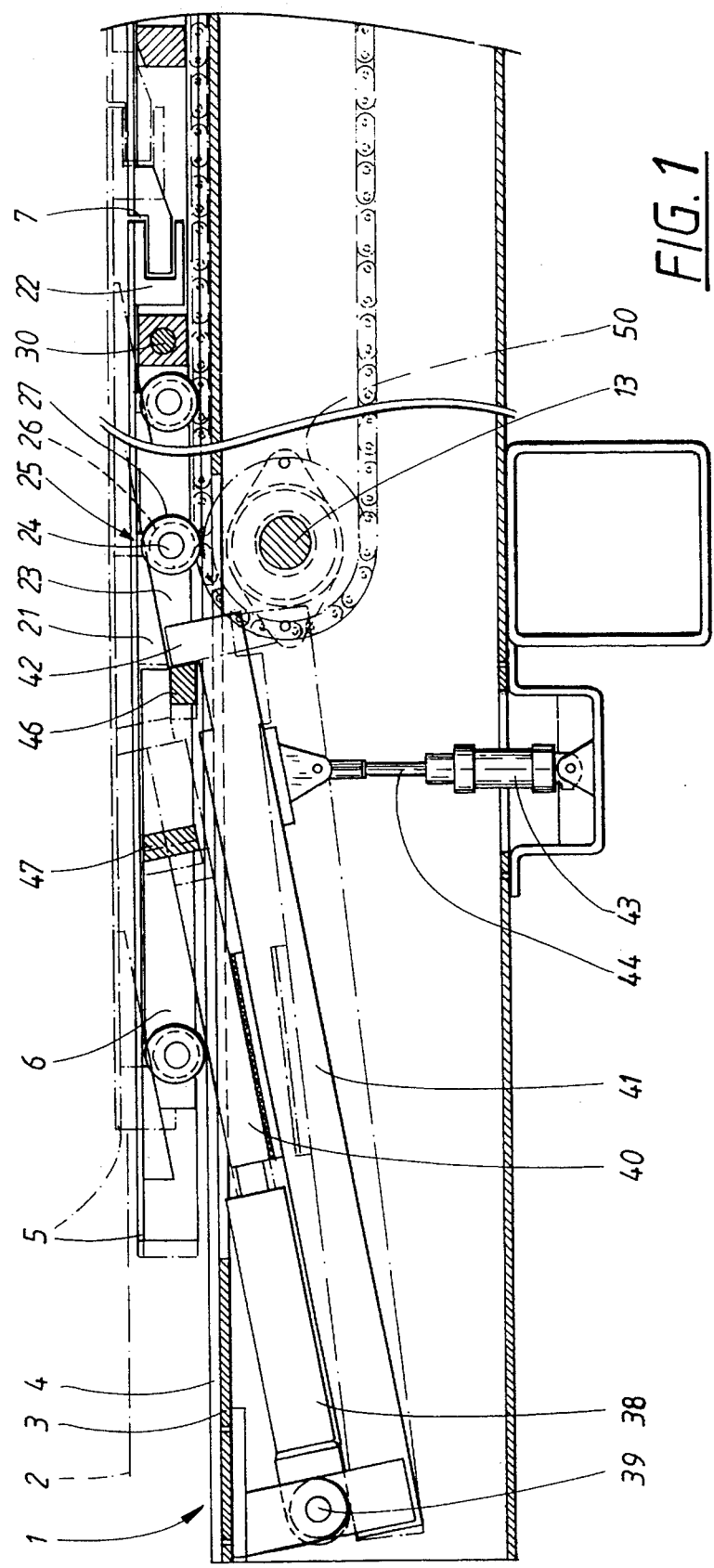
FIG. 1 a longitudinal section of a portion of an active part of the device, whereby a first end portion of the part is shown.
Figure 2:
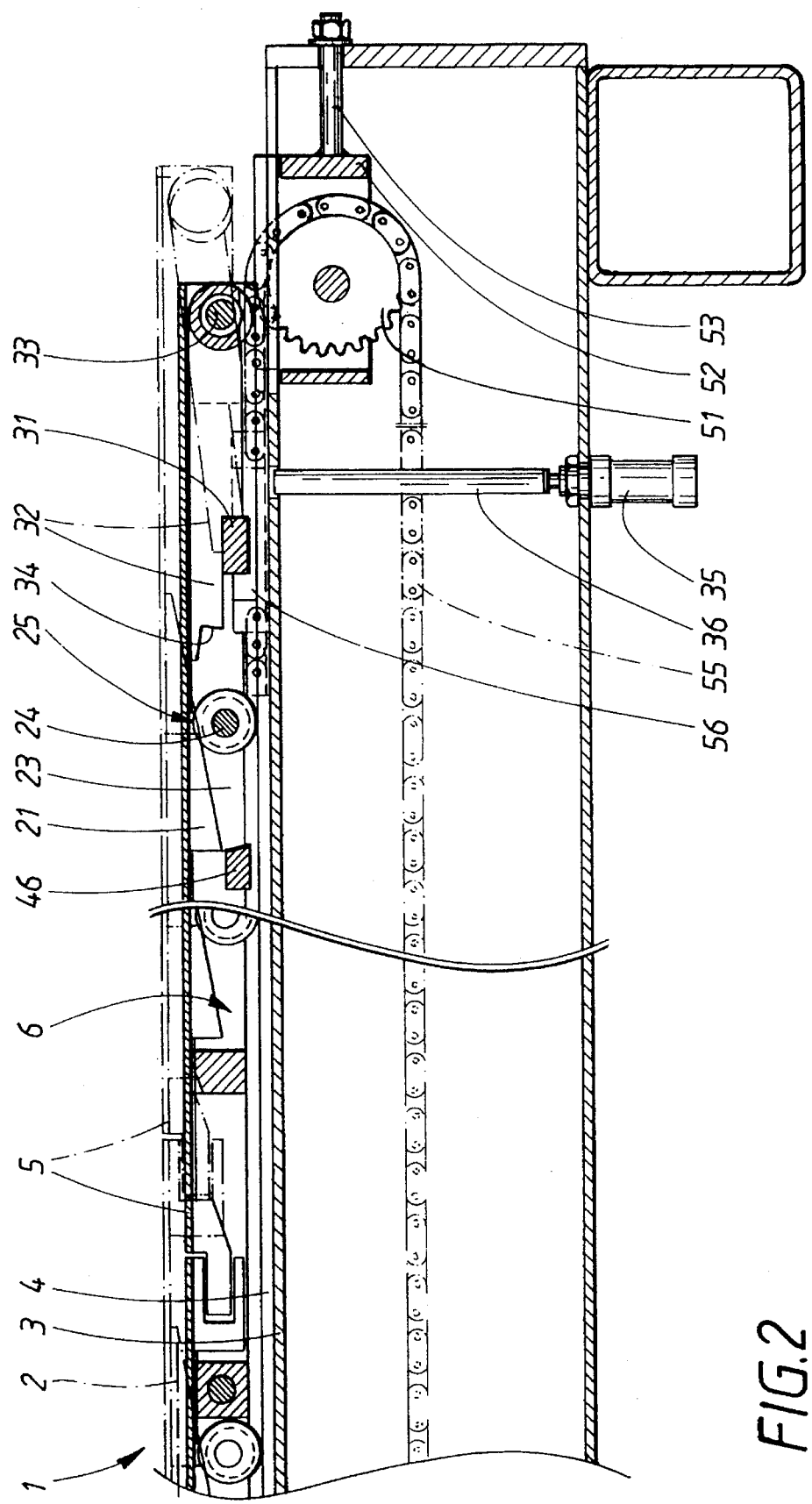
FIG. 2 a corresponding longitudinal section, but showing a portion at the other end of the part (the section has been divided because of the longitudinal shape of the part)

In the following now shall be described the goods carrying devices arrangements for providing the lengthwise movement and the up and down displacement of the goods carrying beams. This will be made with reference to FIGS. 1 and 2 of which FIG. 1 shows a portion of the goods moving device 1 close to the border 9, consequently to the left in FIG. 3, while FIG. 2 shows the opposite end of the goods moving device, consequently its right end in FIG. 3. Alongside with the reference to FIGS. 1 and 2 is reference made also to FIG. 4 in which some of the new, now added reference numerals are shown.

In FIGS. 1 and 2 the goods carrying beam 5 is shown with unbroken lines in its lowered position and with dash-dotted lines in its raised position. The same is to its substantially part formed by a U-shaped beam, which upwards turned portion 20 is forming the goods carrying surface. On the underside of the portion 20 pairs of wedge-shaped projecting bodies 21 are mounted. Also the dividing of the goods carrying beam in sections is shown by indicating of the joint 7 and an articulation 22, which connects the both sections on each side of the joint. The trolley 6 on its side consists of a bar 23 through which are stretching a number of transverse shafts 24, which on both sides of the bar are carrying roller means 25. This is best seen in FIG. 5 in which also is shown that the roller means 25 on each side has an inner rollers 26 with smaller diameter than an outer roller 27. The outer rollers 27 are resting against the both rail profiles 4 and make consequently the movement of the trolley in its lengthdirection possible by the rolling of the rollers on the rail. Against the both smaller, inner rollers 26 the goods carrying beam 5 is resting with its both wedge-shaped bodies 21. Hereby the goods carrying beam is centered between the edges of the outer rollers. Such arrangements are to find along the trolley 6 in equal distances.

Also the trolley 6 can be divided in sections, which is shown with an articulation 30 in FIG. 1.

On both sides of the bar 23 are at its right end bodies 31 (FIG. 2) situated. Near the same the goods carrying beam 5 at its end has a pair of ratches 32, which are swingably carried at 33. In the in FIG. 2 with unbroken lines shown position the ratches are resting on the overside of the body 31 and have an arresting surface 34 to the left of the bodies. In this position the goods carrying beam is positioned with its wedge-shaped bodies 21 with the lower portions of the same in resting position against the perifery surfaces of the rollers 26. If the goods carrying beam is displaced to the right relative to the trolley the bodies 21 will move along the surfaces 26 in direction towards the higher portions of the bodies whereby the goods moving beam is raised relative to the trolley. When a certain position is reached the arresting surface 34 will be situated to the right of the body 31 and will move down behind the same. This prevents that the goods moving beam will move back along the surfaces 26 to the lower position. At the in FIG. 2 shown retracted position of goods moving device the ratchet 32 can be lifted our of engagement (see the dash-dotted lines in the figure) with respective body 31 by means of a bar 36 activated by a power cylinder 35. A corresponding lifting device is also provided at the left end, somewhat to the right of the shaft 15 but is left out in FIG. 1. Before the releasing of the ratchet the same should however be unloaded from the pressure against the body.

Lowering of the goods carrying beam can consequently substantially be effected by means of the gravity after releasing the ratchet by means of any of the power cylinders 35. Rising of the goods carrying beam 5, which consequently is effected by displacing the same to the right relative to the trolley 6 has contrary thereto to be effected by means of a certain power organ. This is formed by a power cylinder 38, which is swingably carried at 39 at the left end of the fram 3 (FIG. 1). On the piston of the cylinder is provided a bar 40 and connected to the very cylinder is an arm 41 with a supporting body 42 at its outer end.

The described and at the axis 39 swingably carried unit can be swinged upwards and downwards by means of a further power cylinder 43 provided with a piston bar 44 jointed to the arm 41. On the trolley 6 on both sides of its middle bar 23 are provided projecting bodies 46 which can cooperate with the supporting body 42 of the arm 41 in the raised position of the arm, shown in FIG. 1. The goods carrying beam on its side is provided with supporting bodies 47 which extend downwards on both sides of the bar 23 and which can be brought in contact with the bar 40 on the piston bar of the cylinder 38. The bar 40 is namely fork-shaped and encloses the trolley.

In FIG. 1 the raised position of the arm 41 is shown in which the bar 40 is in contact with the body 47 and the bodies 42 and 46 are in contact with each other. By manoevring by means of the power cylinder 43 the arm 41 can be lowered so that the unit is free from the bodies 46, 47. A corresponding arrangement of bodies of the same configuration as the bodies 46, 47 is situated also at the right end of the goods carrying beam, which is indicated by a further body 46 shown in FIG. 2.

In FIG. 1 is shown the also in FIG. 3 shown shaft 13. This shaft carries in front of the goods moving device 1 a cog wheel 50 for a chain. A further cog wheel 51 is shown in FIG. 2 at the right end of the device. For this wheel is provided a shaft support 52 and a tightening device 53. Between the both cog wheels a chain 55 is stretching the both ends of which are secured to a holder 56 on the trolley 6. The chain can consequently be tightened between the wheels by means of the tightening device.

By turning of the shaft 13 by the motor 11 and the gear box 12 in the one or the other direction the trolley 6 together with the goods carrying beam 5 can be moved by means of the overpart of the chain 55 between its both end positions.

If it is assumed that a loading vehichle is positioned near the border 9 with the mentioned recess and rail arrangements placed in the front of the respective goods moving device 1 and that goods which is stored on the storing surface 2 shall be moved to the loading plane 15, so shall this at first be effected by raising the goods carrying beams and thereafter moving the same to the left and along the rails 4 in the loading plane 15.

The goods carrying beams 5 and respective trolleys 6 are before this operation situated outmost to the right as shown in FIGS. 1 and 2 and in lowered position as shown with unbroken lines. The first operation by the raising is thereby, by means of the cylinder 43 to raise the arm 41 which carries the cylinder 38, so that the bar 40 and the supporting body 42 are positioned in front of the both bodies 47 and 46 respective. By activation of the power cylinder 38 to push the bar 40 outwards so that the same presses against the body 47 the goods carrying beam 5 is forced to be displaced to the right relative to the trolley 6, which is secured against displacement by means of the supporting body 42 i contact with the bodies 46 of the trolley. The wedge-shaped bodies 21 of goods carrying beam will now move up along the surfaces 26 and the goods carrying beam is raised to its with dash-dotted lines shown raised position. In this position the ratchet 32 is falling down with its arresting surface 34 in front of the body 31, so that a backwards displacement of the goods carrying beam under influence of the gravity is prevented.

At raising of the goods carrying beams 5 the on the goods storing surface 2 resting goods is lifted, so that it will be supported by the goods carrying beams. Now the motor 11 is started and by turning of the shaft 13 the trolley 6 is moved together with the respective goods carrying beam with help of chain 55. The goods is moved out over the border 9 and in over said loading plane 15.

For lowering of the goods carrying beams so that the goods will be lowered onto the loading plane the ratchet 32 shall be lifted. This shall be provided by maneuvering by means of the other, mentioned power cylinder 35, which is situated to the left of the shown power cylinder 35 in FIG. 2. Before that the ratchet however shall be unloaded from the pressure against the body 31. This is effected by activating the device on the arm 41 (FIG. 1) by means of the cylinders 43 and 38 in the way already described but now i cooperation with the to the right situated bodies. Hereby the trolley can be displaced somewhat to the right so that the arresting surface 34 is removed from the body 31 and the ratchet can be lifted by a small power. As soon as the ratchet has been lifted the goods carrying beam will be lowered under influence of the gravity acting on the weight of the carried load in a movement controlled by means of an adapted letting out of the pressure medium from the cylinder 38. Finally a position under the loading surfaces 2 respective 15 is reached whereby the goods is put down. In the lowered position of the goods carrying beam the motor 11 is started in the direction which makes the chain 55 to draw the trolley back to the original position. Now a new raising can be effected by activation of the arrangement on the arm 41. In this way goods can successively be moved from the storage surface 2 to the loading surface 15. If the loading vehicle is provided with several pairs of rails the load can be spread over its loading surface by successive displacement of the vehicle.

If goods has to be unloaded from the vehicle to the storing surface 2 the trolleys are moved with its respective goods moving beams in their lowered position into the rail provided recesses of the vehicle. Thereby the to the right positioned arrangement with the bodies 46 and 47 is placed in position to be activated by the power arrangement on the arm 41. In this way the goods carrying beam 5 and the trolley 6 can be moved relative to each other for raising of the beam. Thereafter the upper part of the chain is moved to the right and is drawing the goods supported by the goods carrying beams in over the storing surface 2 where it can be placed by lowering of the goods carrying beams in the before described working sequence.

In a very rational way the conveyor device will function if the said band-conveyor is provided in connection to the same. By means of the band-conveyor goods can successively be brought to the conveyor device and by means of this be loaded on the vehicle and also in the same way the goods by unloading successively can be transported away by means of the conveyor as soon it has been unloaded from the vehicle. The conveyor device can however work together with other systems than conveyors for the completing handling of the goods, for example together with hauling trucks. It is of course not excluded that the conveyor device is used for other purposes than loading and unloading of vehicles.

It is not necessary that the conveyor device is provided only for moving of goods between two different units as a loading structure and a loading vehicle but can also be provided for transfer of goods in a storing area.

If it is desired that the raising and the lowering of the goods carrying beams not should be restricted to be effected in certain positions along its moving paths, which is the case when the maneuvering device in the described way has fixed position, the power organ can be mounted on the trolley for the relative displacement of the goods carrying beam respective locking of the same. Also such and other modifications are thereby included in the invention.

I claim:

1. A conveyor device comprising, parallel reciprocating beams, said reciprocating beams can carry such goods as containers or pallets in raised position thereof to and from a storing surface, said conveyor provided with a number of substantially parallel to each other elongated goods moving devices, said devices are counter sinked in the storing surface, each said device comprising said goods carrying beams with an upwardly positioned surface for carrying the goods, supporting means for the carrying means is provided on a foundation resting frame, between the frame and the supporting roller means, driving means for lengthwise moving of the supporting roller means together with the carrying beams relative to the frame, raising means situated between the supporting means and the goods carrying beams for vertical displacement of the goods carrying beams relative to the supporting means between a position in which the upper surface of the goods carrying beams is lowered under said goods storing surface and a raised position over said goods storing surface and provided for said vertical displacement between the lowered and the raised position by a lengthwise relative displacement between the goods carrying beams and the supporting collar means, a power device for said lengthwise relative displacement thereby providing said vertical displacement, so that the goods in the raised position can be moved to and from the storing surface by the lengthwise movement of the goods carrying beams, while in the lowered position the goods carrying beams are free to provide lengthwise movement thereof, wherein the power device for the lengthwise displacement of the goods carrying beams relative to the supporting means comprises an activating device positioned on the frame arranged with two holding members, and power means for displacement of said members relative to each other substantially parallel a longitudinal axis of the goods moving device and on the goods carrying beams a surface is provided to be in an arrested connection with the one holding member and on the supporting means a surface is in an arrested connection to the second holding member, the activating device being moved between a first position in which an arresting connection between the arresting members and the respective surfaces is possible, and a second position in which the arresting members are moved away from the first position without the arresting connection, so when the supporting means together with the goods carrying beams are situated in a predetermined lengthwise position relative to the position of the power device on the frame the supporting means and the goods carrying beams can be moved to perform said relative displacement resulted in displacement of the goods carrying beams to the raised position effected by displacement of the holding members of the power means during arresting connection to the respective surfaces.

2. The conveyor device according to claim 1, wherein ratched means is provided for keeping the goods carrying beams and the supporting means in such a relative position that the goods carrying beams are in their raised position, said ratched means is is changed from locking to releasing position in which said goods are free to be displaced relative to each other preferably under the influence of the gravity to the lowered position for the goods carrying means.

3. The conveyor device according to claim 1, wherein the power means is provided to control the lowering displacement of the goods carrying beams under influence of the gravity after bringing the holding members to their arresting connection to said surfaces resulted in speed controlled movement in the relevant direction.

4. The conveyor device according to claim 1, wherein means for providing the vertical displacement comprises wedge shaped elements participating in said relative displacement between the goods carrying beams and the supporting means which are thereby displaced relative to supporting members so that the wedge shaped elements produce said vertical movement of the goods carrying beams relative to the supporting means.

5. The conveyor device according to claim 4, wherein said wedge shaped elements are secured to the goods carrying beams so that their sloping surfaces are turned against the supporting members and said supporting members are formed in the form of rollers carried by shafts against a periphery of which the sloping surfaces can be supported in a rolling movement during said relative movement.

6. The conveyor means according to claim 5, wherein the roller means for providing the lengthwise movement of the goods moving devices is in the form of rollers carried on the same shaft as the respective supporting member rollers.

* * * * *